May 18, 1954  E. S. LOUIS  2,678,864
FOOD WAGON

Filed Aug. 24, 1951  3 Sheets-Sheet 1

Inventor
Edward S. Louis
By Young, Emery & Thompson
Attys.

May 18, 1954  E. S. LOUIS  2,678,864
FOOD WAGON

Filed Aug. 24, 1951  3 Sheets-Sheet 2

Inventor
Edward S. Louis
By Young, Emery & Thompson
Attys.

May 18, 1954     E. S. LOUIS     2,678,864
FOOD WAGON

Filed Aug. 24, 1951     3 Sheets-Sheet 3

Inventor
Edward S. Louis
By Young, Emery & Thompson
Attys.

Patented May 18, 1954

2,678,864

UNITED STATES PATENT OFFICE 2,678,864

FOOD WAGON

Edward Stanislas Louis, Snaresbrook, London, England

Application August 24, 1951, Serial No. 243,540
Claims priority, application Great Britain, September 18, 1950

2 Claims. (Cl. 312—272.5)

This invention concerns food waggons, by which is to be understood waggons for carrying prepared foods (such as hors-d'oeuvre) or drinks around a room or cocktail waggons which hold bottles, glasses, cocktail shaker and so on.

The object of the present invention is to provide a food waggon having a large storage space for food and/or drink and in which the food and/or drink is readily accessible for serving.

Another object of the invention is the provision of foldable extensions to the waggon to act as shelves on which dishes and glasses may be placed outside the storage space.

According to the present invention a food waggon comprises an open-topped compartment within which food and/or drink is to be stored, a lid to close the compartment, a tray within the compartment to receive food and/or drink and a mechanical connection between the lid and the tray whereby when the lid is moved to open the compartment, the tray is raised, and when the lid is moved to close the compartment, the tray is lowered.

The accompanying drawings show one practical arrangement of a cocktail waggon, by way of example only, in accordance with this invention. In the drawings.

Figure 1:
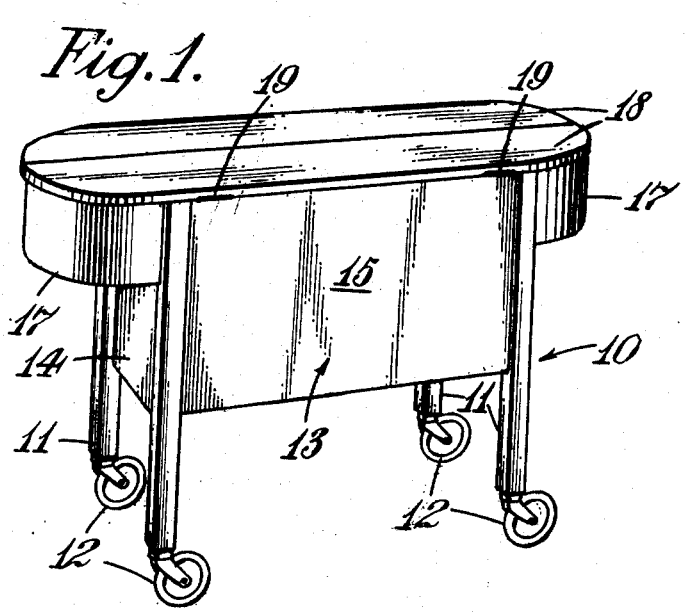
Figure 1 is a perspective view of the waggon when closed.
Figure 4:
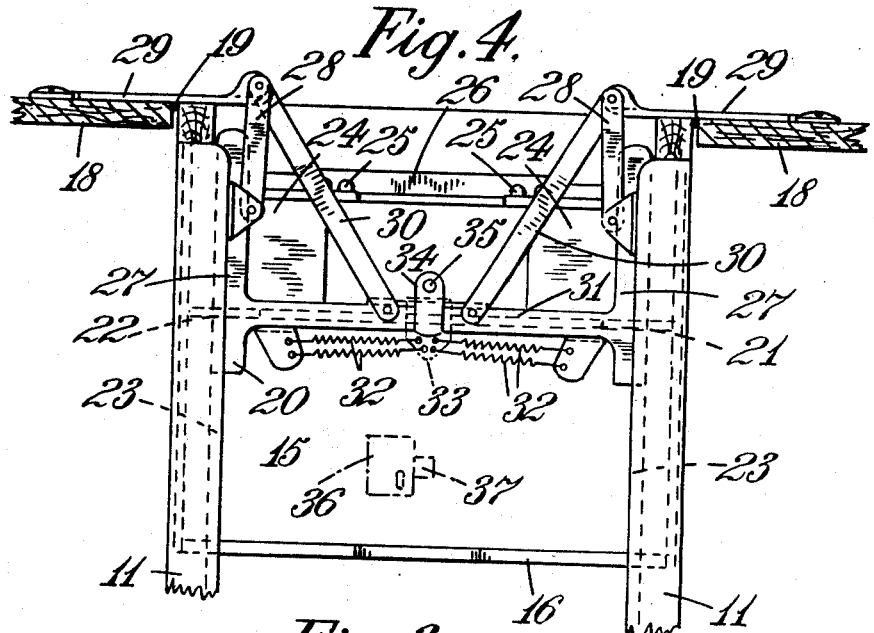
Figure 4 is a section on the line 4—4 of Figure 3, the lid of the compartment being fully open.
Figure 3:
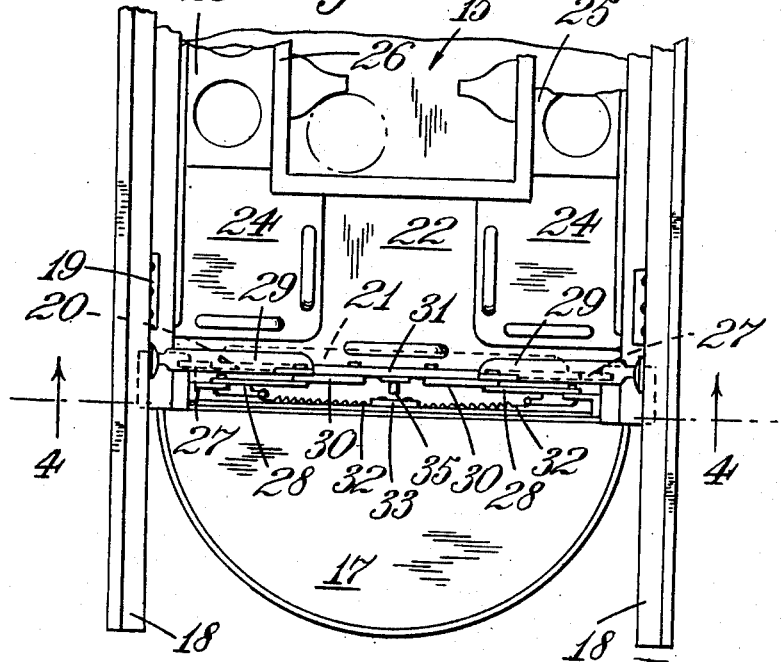
Figure 3 is a plan view of the waggon, when partly open, showing a part thereof to a larger side.
Figure 5:
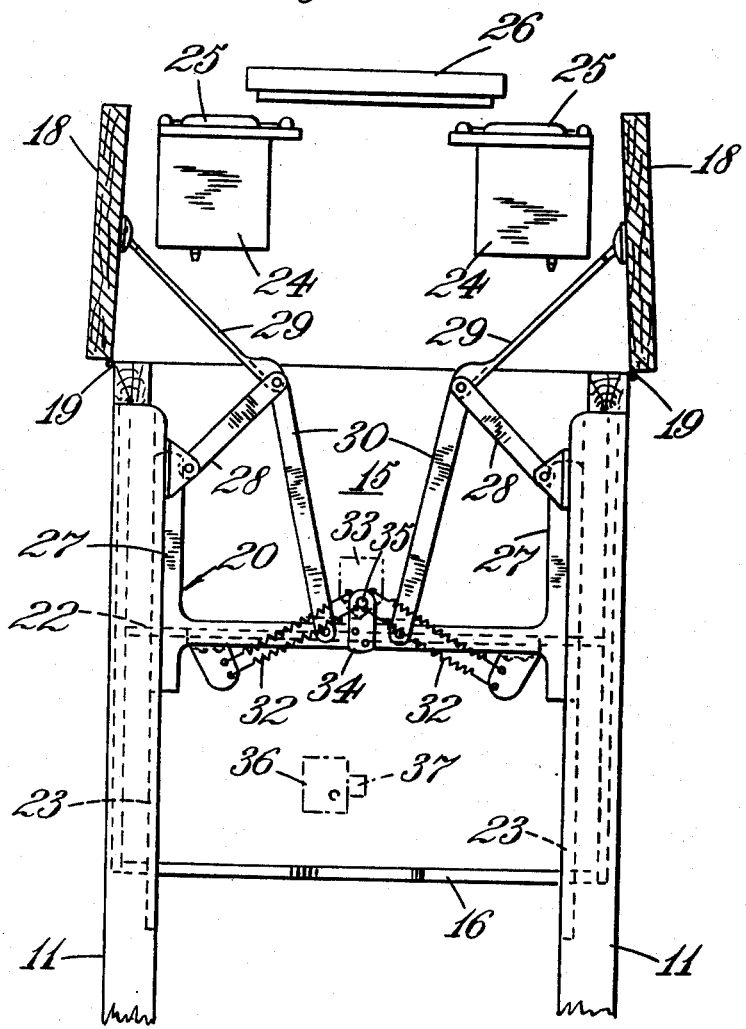
Figure 5 is a view similar to Figure 4 with the lid shown in the part open position.

The cocktail waggon comprises a carriage 10 having legs 11 mounted on swivelling wheels or castors 12, the legs being connected by panels 13, 14 which form the sides and ends respectively of a compartment 15 which is open at the top and is closed at the bottom by panel 16 (Figures 4 and 5). The panels 14 are of less height than the side panels 13 and enclosed semi-circular extensions 17 are attached to the ends within which glasses and so on may be stored (see Figure 2). A pair of half lids 18 are hinged to the upper edges of the side panels, at 19, the lids being adapted to close the compartment and the semi-circular extensions. The lids are movable from a closed horizontal position to an open horizontal position extending along the ouside on the compartment—compare Figures 1 and 2.

In each end of the compartment there is mounted a U-shaped member 20 having a horizontal edge 21 to receive a tray 22 which constitutes a false bottom of the compartment. Each U-shaped member is adapted to move up and down between the pair of legs 11 at one end of the compartment for which purpose the legs are grooved at 23, to receive the uprights 27 of member 20. The members 20 are connected to each of the pair of lids 18 through a linkage which is so arranged that when the half lids are opened the U-shaped members (and hence the tray) are raised (Figure 4) and when the half lids are closed the tray is lowered. The tray carries fittings 24, 25, 26 which are adapted to support bottles and glasses so that they may be stored in a compact manner and without danger of being knocked over.

Figure 2:
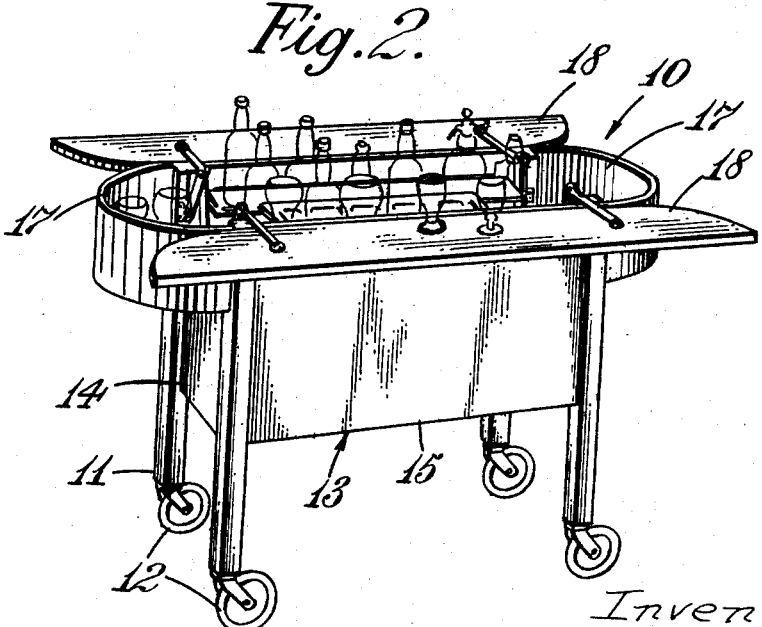
Figure 2 is a perspective view of the waggon when open.

Since with the arrangement described when the lids are opened the tray is raised ready access is had to the bottles and glasses standing on the tray (Figure 2). Moreover, since when the lids are moved to close the compartment, the tray is lowered, relatively tall bottles may stand on the tray and will be stored within the compartment when it is closed.

It is preferred that each half lid be connected to both of the U-shaped members which support the tray although it will be appreciated that one lid only may be connected to the means for raising and lowering the tray or alternatively each lid may be connected to said means at one place only.

In the preferred arrangement of linkage shown in the drawing, the upright limbs 27 of each U-shaped member are each connected to one end of a link 28 which is pivotally mounted on the leg of the waggon. The link is connected to one end of a pivotal arm 29, the other end of which is hinged to the lid. When the lid is open the link 28 is in a vertical position and lies against its associated leg of the waggon so that it is incapable of movement to permit the lid to drop from its horizontal open position. When the lid is raised the arms move the links downwardly and inwardly. The links are connected by bars 30 which extend downwardly and inwardly towards, and are attached, to, the horizontal limbs 31 of the members 20 (the tray supports) whereby the U-shaped member is lowered as the lids are closed. The limbs 27 being received by the vertical slots 22 in the legs of the waggon are adequately guided with vertical movements of member 20.

With the arrangement described when one lid only is raised, the members 20 are tilted and bear against the legs of the waggon, whereby the movement of the single lid is restricted to a small amount. It is therefore impossible to close one of the half lids—both lids must be simultaneously raised to do so. Nevertheless, it is possible to raise one lid to open the compartment and, through the linkage described, simultaneously to raise or open the other.

The fittings 24, 25, 26 are removable from the compartment for cleaning purposes and the tray 22 may also be removable for this purpose.

Instead of providing fittings to receive glasses and bottles, it will be understood that the fittings may be adapted to receive and support dishes for food.

It is preferred that the weight of the tray and the contents of the compartment be partly balanced by springs 32 connected, at one end, to plates 33 secured to the end panels 14 of the compartment and, at the other end, to the horizontal limbs 31 of members 20 so that the lids may be opened without undue effort. In this connection it is arranged that when the lids close the compartment the link 28 and bar 30 assume a substantially vertical position, the pivotal connection between the link and the bar being either on, or slightly to either side of, the dead centre position whereby the face of the springs 32 is not applied to the link and bar so as to open the lids. Consequently springs may be provided to more than counterbalance the combined weight of the tray, contents and of the lids without having thereby any tendency for the lids to be opened by the springs. Indeed, if the pivotal connection is brought slightly past the dead centre position the springs will tend to hold the lids closed.

One of the limbs 31 carries a plate 34 with a projecting pin 35 and a lock 36 is secured to the inside of the corresponding end panel 14, the bolt 37 of the lock being arranged to pass above pin 35 when the lids are closed to lock them in this position.

With the arrangement described each arm 29 and its associated bar 30 constitute a tie extending upwardly through the compartment from the tray (with which the bar is connected as described) to the lid, to which the arm 29 is connected at a point remote from the hinge axis 19. The link 28 which swings in a vertical plane within the compartment constitutes a guide to engage the tie comprised by the arm 29 and the bar 30 to maintain the lower part of the tie (i. e. bar 30) substantially vertical. The swinging link 28 is such that when the lid 18 is fully open the arm 29 is maintained substantially horizontal. The opening and closing movements of the lid are communicated to the tie so that the bar 30 is moved in its lengthwise direction to raise and lower the tray.

While the preferred embodiment of the invention has been described specifically and in detail, numerous variations and changes in design may be made within the scope of the invention and the specific terms used in describing the practical embodiment are not to be considered as limiting the scope of the invention, which is defined in the claims.

I claim:

1. A food wagon comprising a storage compartment having a lid hinged to one side thereof and movable from a closed position to an open position in which said lid extends horizontally from one side of said compartment, and including a tray vertically slidable within said compartment and link means for communicating the movement of said lid to said tray whereby said tray assumes a raised position when said lid is open and a lowered position when said lid is closed, wherein said link means comprises a bar pivotally connected to said tray and extending upwardly therefrom through said compartment, an arm pivotally connected at one end to the upper end of said bar and at the other end to said lid at a point remote from the hinge of said lid, and a link fulcrumed at a point within said chamber adjacent the point thereof to which said lid is hinged, said link being attached to the pivotal connection between said bar and arm.

2. A food wagon comprising a storage compartment having a lid hinged to one side thereof and movable from a closed position to an open position in which said lid extends horizontally from said compartment, and including a tray vertically slidable within said compartment, link means for communicating the movement of said lid to said tray whereby said tray is lowered when said lid is closed and raised when said lid is opened, and spring means constantly acting on said tray for counterbalancing the weight thereof, wherein said link means includes a bar pivotally attached to said tray and extending upwardly therefrom within the said compartment, a link pivotally connected at one end to the upper end of said bar and at the other end to a support in said compartment adjacent the side thereof to which said lid is hinged, and an arm pivoted at one end to said bar and link and at the other end to said lid at a point spaced from the hinge of said lid, said bar and link being movable to approximately mutually aligned positions when said tray is moved to said lowered position.

References Cited in the file of this patent

UNITED STATES PATENTS

| Number | Name | Date |
| --- | --- | --- |
| 428,345 | Melville | May 20, 1890 |
| 1,249,514 | Scharer | Dec. 11, 1917 |
| 1,457,744 | Newman et al. | June 5, 1923 |